(12) United States Patent
Stokkan et al.

(10) Patent No.: US 7,512,589 B2
(45) Date of Patent: Mar. 31, 2009

(54) TEMPORAL KNOWLEDGEBASE

(75) Inventors: Solve Stokkan, Ski (NO); Stephen Haler, Coeur d' Alene, ID (US); Karl Pauls, Liberty Lake, WA (US)

(73) Assignee: TriGeo Network Security, Inc., Post Falls, ID (US)

( * ) Notice: Subject to any disclaimer, the term of this patent is extended or adjusted under 35 U.S.C. 154(b) by 290 days.

(21) Appl. No.: 11/355,212

(22) Filed: Feb. 14, 2006

(65) Prior Publication Data

US 2006/0195482 A1 Aug. 31, 2006

Related U.S. Application Data

(60) Provisional application No. 60/656,326, filed on Feb. 25, 2005, provisional application No. 60/656,338, filed on Feb. 25, 2005, provisional application No. 60/656,325, filed on Feb. 25, 2005, provisional application No. 60/656,337, filed on Feb. 25, 2005, provisional application No. 60/656,315, filed on Feb. 25, 2005.

(51) Int. Cl.
*G06F 7/00* (2006.01)

(52) U.S. Cl. .......................................... 707/2; 709/216

(58) Field of Classification Search ....................... None
See application file for complete search history.

(56) References Cited

U.S. PATENT DOCUMENTS

2002/0078121 A1\* 6/2002 Ballantyne .................. 709/102
2002/0080810 A1\* 6/2002 Casais ........................ 370/428
2004/0190526 A1\* 9/2004 Kumar et al. .......... 370/395.21

\* cited by examiner

*Primary Examiner*—Pierre M Vital
*Assistant Examiner*—Truong V Vo
(74) *Attorney, Agent, or Firm*—Huntsman Law Group, PLLC; Robert A. Huntsman

(57) ABSTRACT

Systems and methods are described to address the problem of maintaining only unique data values accessed through name-value tuple sets. A knowledgebase represents data in tuple sets where all the data across the tuples comprise unique instances for memory conservation and system performance purposes. The knowledgebase stores and maintains unique values in a data store structure and represents the values as tuples through the tuple store structure. Modules access tuples and their values through handles called tuple tickets. The knowledge base defines a set of valid data types that can be maintained, and all data types are accessible via a common interface. In addition, memory management is optimized using a system that frees objects that are no longer referenced.

1 Claim, 8 Drawing Sheets

TEMPORAL KNOWLEDGEBASE

RELATED APPLICATIONS

This application claims priority to U.S. Provisional Patent Application No. 60/656,326, filed Feb. 25, 2005 and entitled EFFECTIVE POLICY THROUGH INTELLIGENT CORRELATION (EPIC) RULE LANGUAGE; U.S. Provisional Patent Application No. 60/656,338, filed Feb. 25, 2005 and entitled MATCH NETWORK CONSTRUCTION; U.S. Provisional Patent Application No. 60/656,325, filed Feb. 25, 2005 and entitled TEMPORAL RESOLUTION OF JOIN NODES IN EVENT CORRELATION; U.S. Provisional Patent Application No. 60/656,337, filed Feb. 25, 2005 and entitled REAL-TIME THRESHOLD STATE ANALYSIS; U.S. Provisional Patent Application No. 60/656,315, filed Feb. 25, 2005 and entitled TEMPORAL KNOWLEDGEBASE, the disclosures of which are hereby incorporated by reference in their entireties.

SUMMARY

In one embodiment, a working memory module comprises a tuple store sub-module comprising a first hash table including a plurality of elements. Each element of the first hash table comprises one of a plurality of second hash tables. The working memory module further comprises a data store sub-module comprising a value lookup table in communication with the plurality of second hash tables of the tuple store and a threshold store sub-module in communication with the tuple store sub-module. The threshold store sub-module is configured to create tuples in the tuple store sub-module and to access values stored in the data store sub-module. The working memory module further comprises a state variable store sub-module in communication with the tuple store sub-module, wherein the state variable store sub-module is configured to create tuples in the tuple store sub-module and to access values stored in the data store sub-module. The working memory module is configured to maintain only unique data values, which are automatically purged from the working memory module when no longer referenced.

In another embodiment, a method is implemented for determining whether to trigger an action associated with an event correlation rule implemented in a correlation system. The method comprises determining whether a plurality of events occur within a selected within time period. The selected within time period is measured from the occurrence of the first of the plurality of events and comprises a relative time period independent of the actual time at which the events occur. The method further comprises determining whether the plurality of events occur within a selected response window. The selected response window is used to evaluate the real-time significance of the events and comprises an absolute time range corresponding to the actual time at which the events occur in the correlation system. If the plurality of events occur within the selected within time period and within the selected response window, the method further comprises triggering the action associated with the event correlation rule.

These and other embodiments of the present application will be discussed more fully in the detailed description. The features, functions, and advantages can be achieved independently in various embodiments of the present application, or may be combined in yet other embodiments.

BRIEF DESCRIPTION OF THE DRAWINGS

Like reference numbers and designations in the various drawings indicate like elements.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

The systems and methods described below address the problem of maintaining only unique data values accessed through name-value tuple sets. The unique values are automatically purged from the knowledgebase when no longer referenced.

The knowledgebase is used to facilitate decisions based on data inputs events which are submitted to the system in real-time. These input events are referred to herein as alerts. The result of decisions arrived at based upon use of the knowledgebase are called actions. The actions occur in real-time and are given as parameters to the knowledgebase data inputs that support them. In this embodiment, rules specify which alerts produce what actions.

The knowledgebase represents data in tuple sets where all the data across the tuples are unique instances for memory conservation and system performance purposes. In addition, memory management is optimized using a system that frees objects that are no longer referenced.

The knowledgebase stores and maintains unique values in a data store structure and represents the values as tuples through the tuple store structure. Modules access tuples and their values through handles called tuple tickets. The knowledge base defines a set of valid data types that can be maintained, and all data types are accessible via a common interface, called DataTypeInterface. The data types are utilized first for employing weak references to ensure that only referenced values are maintained at any point in time, and second to provide an interface for logical comparisons of data of different mathematical representations.

Figure 1:
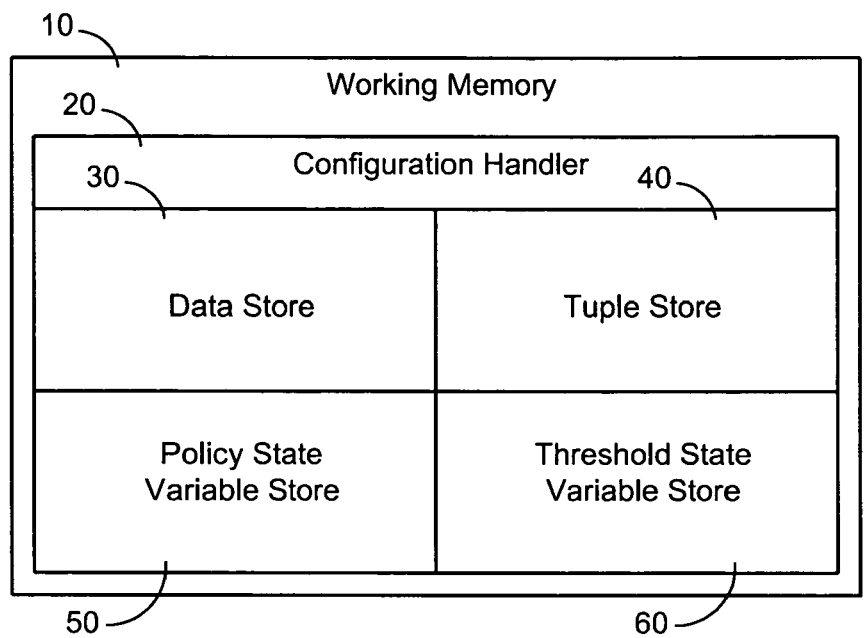
FIG. 1 shows a working memory module and sub-modules.

FIG. 1 shows the working memory module 10, which comprises a policy component that maintains a knowledge base called the working memory. The working memory module 10 stores data that are currently being processed or have yet to be processed by the match network.

In some embodiments, the working memory module 10 comprises five sub-modules: a configuration handler sub-module 20, a data store sub-module 30, a tuple store sub-module 40, a policy state variable store sub-module 50, and a threshold variable store sub-module 60.

The terms "module" and "sub-module" as used herein, may refer to any combination of software, firmware, or hardware used to perform the specified function or functions. It is contemplated that the functions performed by the modules described herein may be embodied within either a greater or lesser number of modules than is described in the accompanying text. For instance, a single function may be carried out through the operation of multiple modules, or more than one function may be performed by the same module. The described modules may be implemented as hardware, software, firmware or any combination thereof. Additionally, the described modules may reside at different locations connected through a wired or wireless telecommunications network, or the Internet.

Figure 2:
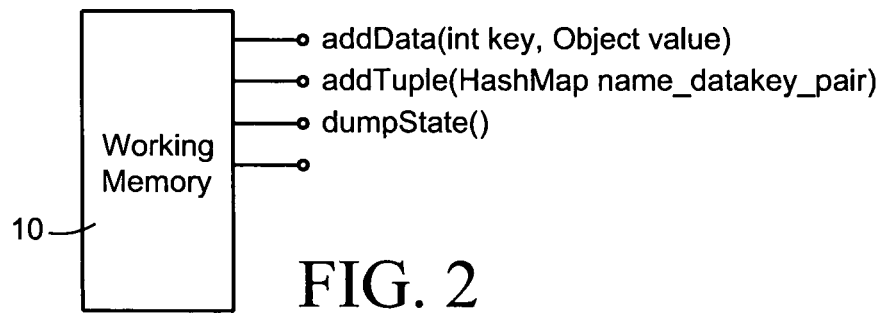
FIG. 2 shows an interface between the working memory module and some of its methods.

FIG. 2 shows an interface between the working memory module 10 and some of the working memory module's 10 methods. The method addData(int key, Object value) adds a value to the data store 30 in the working memory 10. The method addTuple(HashMap name_datakey_pair) adds data to the data store 30 and a tuple to the tuple store 40. The method dumpState( ) writes the state of the working knowledge to disk.

Figure 3:
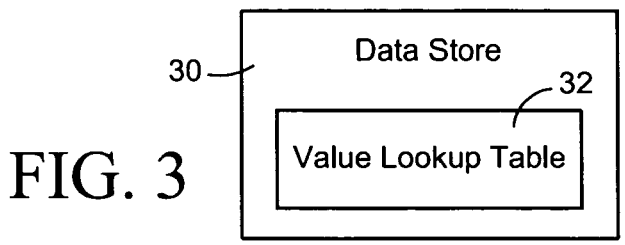
FIG. 3 shows a relationship between a data store sub-module and a value lookup table sub-module.

The data store sub-module 30, shown in FIG. 3, comprises a sub module, the value lookup table sub-module 32. The data store sub-module 30 is a data structure that stores all input data values, called DataTypeInterface values, used by the policy component. Each DataTypeInterface value in the data store sub-module 30 holds a single unique input value. The method for ensuring that each DataTypeInterface value is unique is described below. For each new input value to the knowledge base, the Data Store 30 performs a process of converting duplicated input values to unique values. Each value in the Data Store 30 is associated with a weak reference, such that when the value is no longer used, it is removed from the Data Store 30. The Data Store 30 uses a table that purges its elements once the elements are unreferenced.

Figure 4:
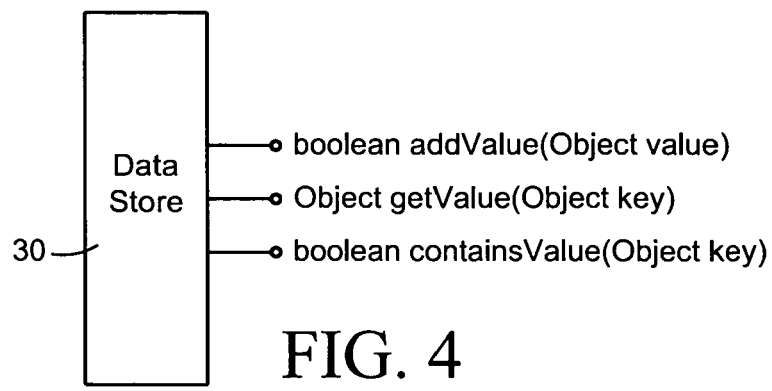
FIG. 4 shows a relationship between a data store sub-module and some of its methods.

FIG. 4 shows an interface between the data store sub-module 30 and some of its methods. The method addValue (Object value) adds an entry to the value lookup table 32, if and only if the value does not already exist in the data store 30. The method Boolean containsValue(Object value) queries the value lookup table 32 to check if the value exists. The method Object getValue(Object value) returns the reference to the value stored in either the data store sub-module 30 or the value lookup table sub-module 32 off of the key generated by the value object.

Figure 5:
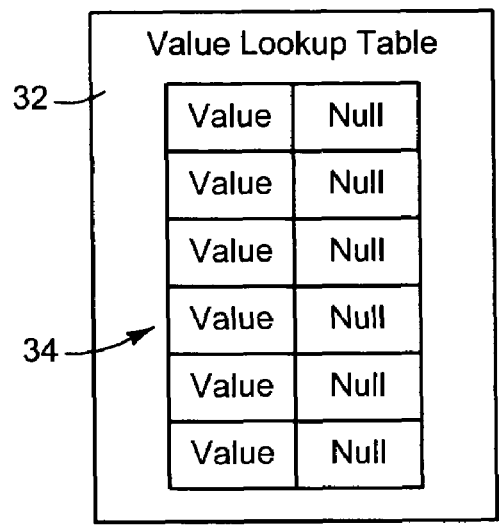
FIG. 5 shows a relationship between the value lookup table sub-module and a weak hash map.

The value lookup table sub-module 32, shown in FIG. 5, is implemented using a weak hash map 34 that hashes the value (which may be a mutable object) that is to be stored as the key for O(1) lookup purposes. Since the value also functions as the key in the hash map, there is no need for storing an entry for each key. However, the value may be set to NULL because all hash-map elements have a value entry. Each entry in the weak hash map 34 is associated with a lookup key, which is a key generated from the stored value.

The data store sub-module 30 does not have duplicate entries of identical values, and the insertion of new data is a one time O(1) operation based on the unique key. In some embodiments, this is accomplished using the weak hash map 34, a data structure used in the Java programming language. Entries are removed from the data store sub-module 30 when the entry's references have been garbage collected. Entries can also be cached to disk if they have not been accessed after a long time interval, or if there is a shortage of memory available. Using a weak hash-map enables the data store 30 to garbage collects its elements when no references is held to an element key.

The tuple store sub-module 40 comprises a data structure that stores tuples, and maintains data collections in name-value pair tuples. A tuple could be considered as a one row table with multiple columns called attributes. Each attribute then has a name and a value, as shown in the following table:

| Attribute-name1 | Attribute-name2 | Attribute-name3 | Attribute-name4 |
|---|---|---|---|
| Value 1 | Value 2 | Value 3 | Value 4 |

Figure 8:
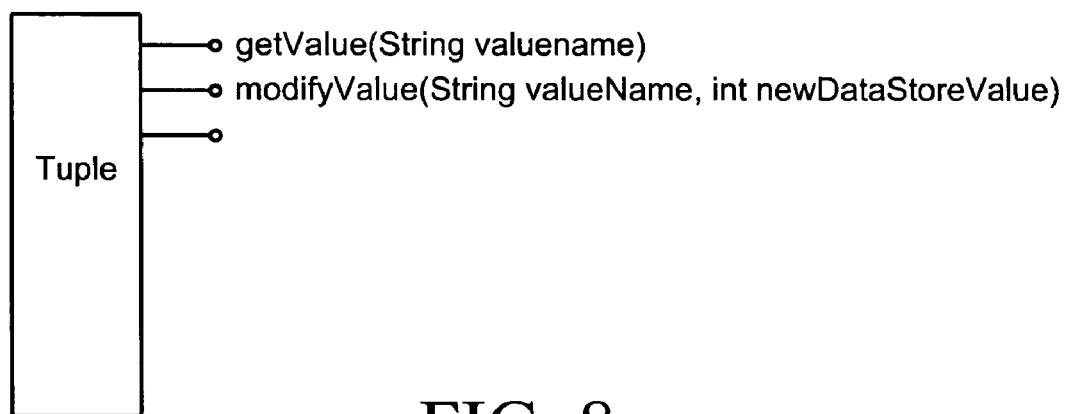
FIG. 8 shows an interface between a tuple and some of its methods.
Figure 9:
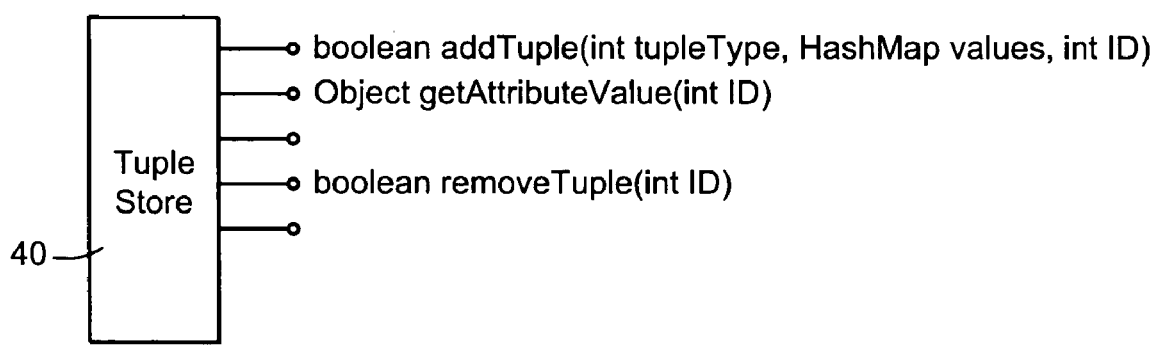
FIG. 9 shows an interface between the tuple store sub-module and some of its methods.

An interface between a tuple and some of the tuple's methods is shown in FIG. 8. The method getValue(String valuename) returns a value from the tuple data 42 with the specified attrbiute name. The method modifyValue(String valuName, int newDataStoreValue) modifies a tuple data's 42 value with the specified attribute name by replacing its old value with the specified one. An interface between the tuple store sub-module 40 and some of its methods is shown in FIG. 9. The method addTuple(int tupleType, HashMap values, int ID) adds a tuple data 42 to the tuple store sub-module 40. The method getAttributeValue(int ID) gets a particular value from the a tuple data 42 in the tuple store 40. The method removeTuple(int ID) removes the tuple data 42 with the specified id from the tuple store 40.

A tuple in the tuple store sub-module 40 represents a collection of values that make up a single input entity to the policy component. For example, an alert may be represented by a tuple where the tuple attribute values are alert fields accessed by the rules. Each tuple has an unique ID for access, and the IDs are recycled as tuples are removed from the tuple store 40.

A tuple is accessible in the store through a unique id-value held by a handle object called a ticket 49. A ticket 49 is a handle to a tuple entry in the tuple store sub-module 40 in the knowledge base. The ticket 49 provides an interface for retrieving tuple entry values and removing tuples from the tuple store sub-module 40. A value within a tuple is accessible through the name associated value in the name-value pair and unique tuple id held by a ticket 49.

Figure 6:
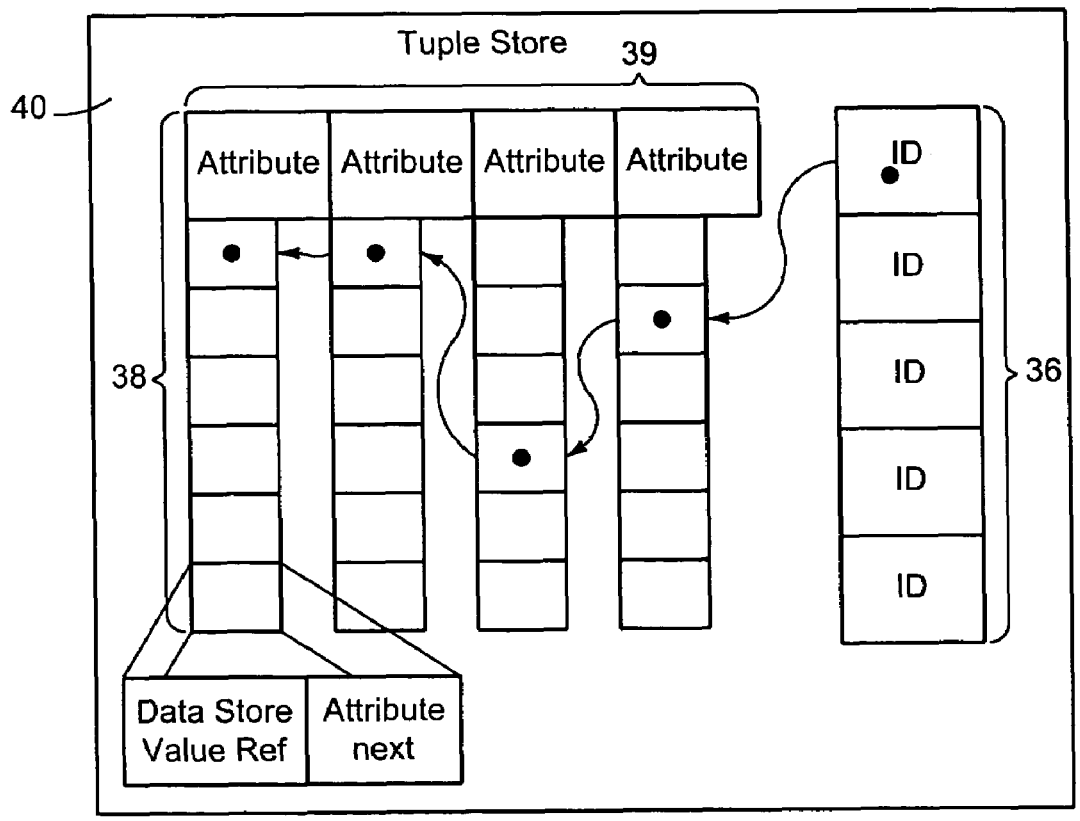
FIG. 6 shows a relationship between a tuple store sub-module, an attribute table, a value table, tuples, and a tuple identification table.

The tuple store sub-module 40 maintains tuple structures using a main hash table with hash table elements, as shown in FIG. 6. The attribute table 39 is a table that maintains tuple attribute names as key values and a value table 38 as a value.

The value table 38 is a table that maintains the tuple's unique id as an access key and the tuple's value for that attribute as a value. The value table 38 maintains all possible values associated with the attribute name given in the attribute table 39 entry across all tuples.

The ticket 49 is created when an input event is submitted to the policy component for processing. The event values are the new input values which are entered into the Data Store as tuples. To access an entry in a tuple, the attribute name is queried in the attribute table 39. This query returns a value table 38 with all values associated with that tuple name. Accessing the desired value is then achieved by querying the value table 38 given the unique id of the tuple in question. For improved maintenance of the tuple values, a tuple-ID-table 36 is maintained. This table maintains all possible tuple id values currently in use by using the tuple id as key values and a linked list to all the associated attribute values. In this way, given a tuple id, modification operations such as purge tuple can quickly locate all elements associated with this tuple.

Figure 7:
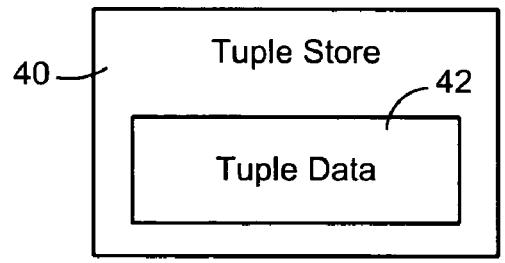
FIG. 7 shows a relationship between the tuple store sub-module and a tuple data sub-module.

Because tuples do not exist as a data type in the Java programming language, a different implementation approach may be used to accomplish this data type. To accomplish the tuple data type, the tuple store sub-module 40 may comprise a tuple data sub-module 42, as shown in FIG. 7. Three implementations of the tuple data sub-module 42 are described herein.

Figure 10:
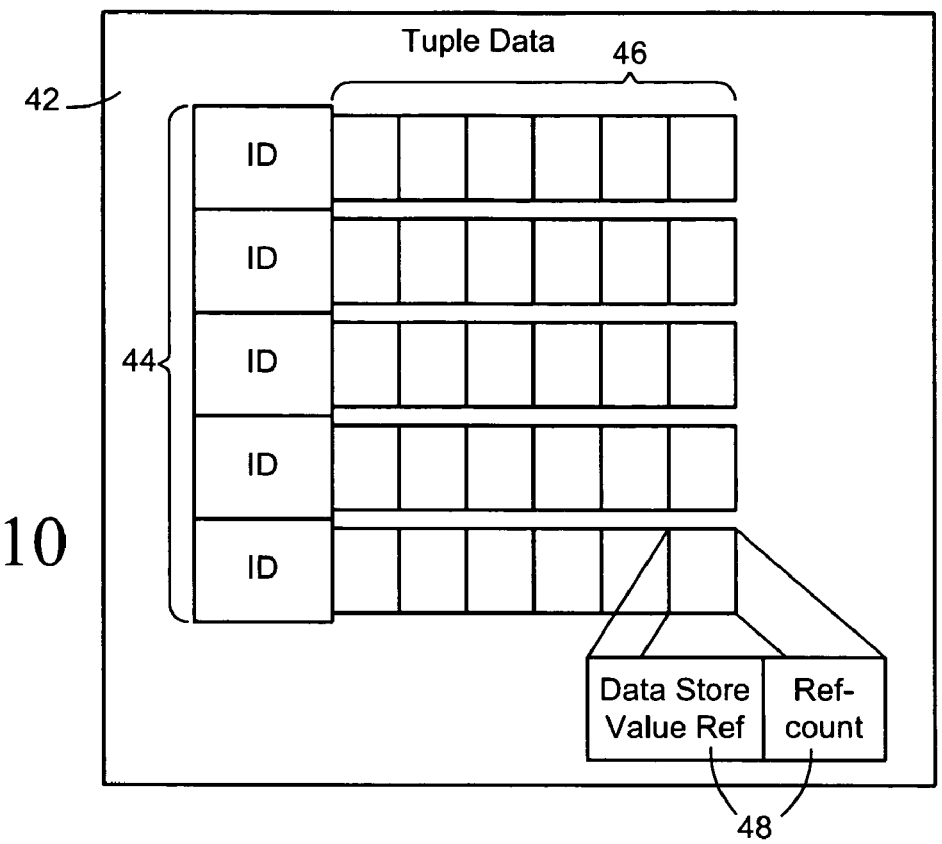
FIG. 10 shows an embodiment of the tuple data sub-module.

One implementation of the tuple data sub-module 42 is shown in FIG. 10. In this implementation, the tuple data sub-module 42 comprises a first hash table 44. Each element in the first hash table 44 corresponds to an element hash table 46. The first hash table 44 is keyed off of the tuple/ticket Ids, whereas the element hash tables 46 are keyed off of attribute values. The elements 48 stored in the element hash table 46 contain a reference to a value in the data store sub-module 30 and an integer count that functions as a reference count. The reference count comprises a decaying counter that is initialized to the maximum number of possible operations, including action parameters, that may be performed on the stored value by the match network. If this count reaches zero, then the value will not be used for new operations, and may be removed. Each tuple has an ID which is the same ID given to tickets 49. Because each ticket 49 is associated with only one tuple, each tuple ID is given the same ID as its associated ticket 49, and should be unique, just as the ticket ID is unique.

An advantage of this implementation is that the lookup time and delete time are of order O(1) operation time, which is considered relatively fast because the time required for an order O(1) operation remains constant, independent of the size of the data set. A disadvantage of this implementation, however, is that creating a hash table for each possible ticket 49 can lead to creating and deleting a large number of tables, which in turn consumes a large amount of memory.

Figure 11:
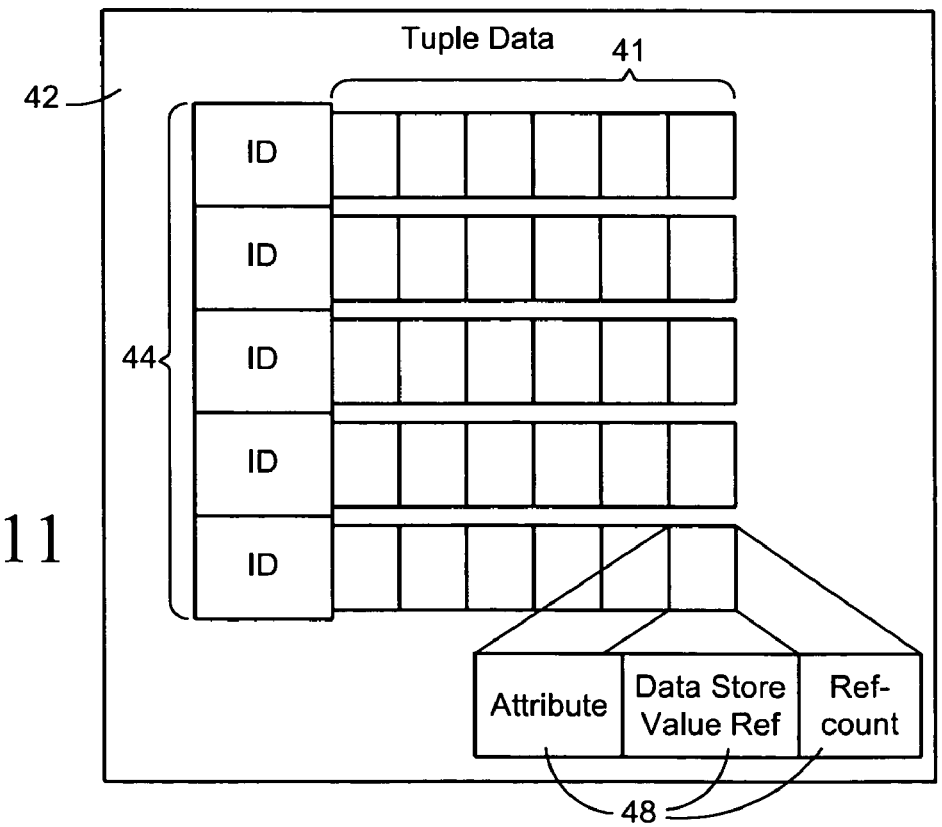
FIG. 11 shows an alternative embodiment of the tuple data sub-module.

An alternative implementation of the tuple data sub-module 42 is shown in FIG. 11. This implementation is similar to the implementation shown in FIG. 10, but instead of creating a hash table for each tuple to hold all the attribute values, this implementation creates vectors. The first hash table 44 is keyed off the tuple/ticket IDs, while the element vector tables 41 each contain a list of attribute values. The elements stored in the attribute vector tables 41 each contain a reference to a value in the data store sub-module 30, the name of the attribute, and an integer count that functions as a reference count. The reference count and value reference have the same meaning as in the implementation shown in FIG. 10.

The implementation shown in FIG. 11 has the advantages that its deletion time is of order O(1), and that it utilizes less memory than the implementation shown in FIG. 10 because the implementation shown in FIG. 11 uses vectors instead of hash tables. A disadvantage of the implementation shown in FIG. 11 is that it does utilize a lot of memory, and that retrieval of attribute values are now of operation O(n), where 'n' is the maximum size of the list of attributes, which is considered a disadvantage because the time required for an order O(n) operation linearly increases, dependent on the size of the data set.

Figure 12:
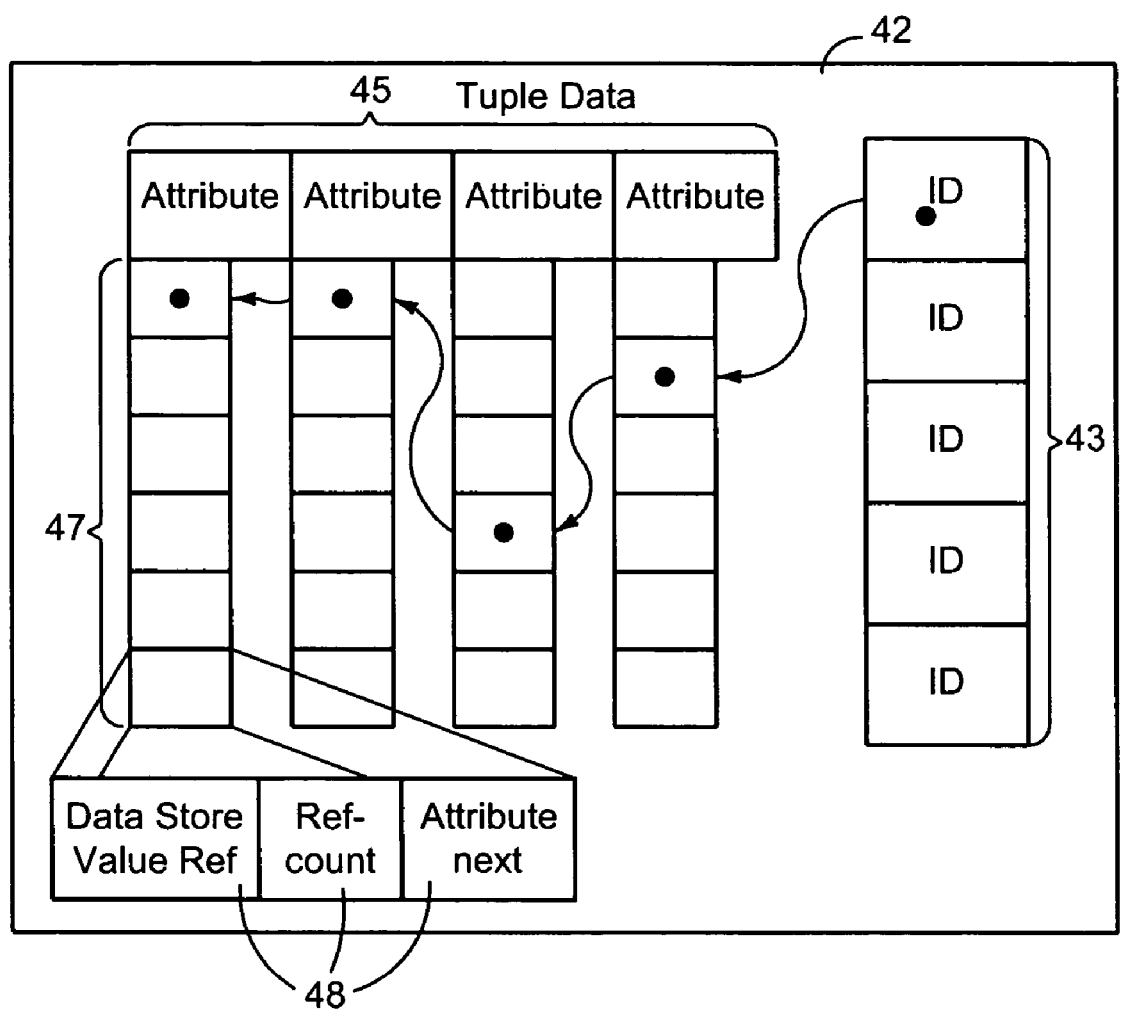
FIG. 12 shows another alternative embodiment of the tuple data sub-module.

Another alternative implementation of the tuple data sub-module 42 is shown in FIG. 12. The implementation shown in FIG. 12 uses a second hash table 45, with third hash tables 47 as elements of the second hash table 45. In this implementation, the second hash table 45 has tuple attribute values as keys. Because the number of possible attribute values in the system has an upper bound, the attribute values will be defined as constant Integer values to avoid using long Strings as attribute keys. Each of the second hash table 45 entries contains a third hash table 47 as its value. This third hash table 47 is keyed by the ID of a ticket 49. To access an entry in a tuple, the attribute value is first looked up, then the tuple given by the ticket ID. The elements 48 have the same properties as the elements 48 of the implementation shown in FIG. 10, except that the elements 48 of the implementation shown in FIG. 12 also hold a reference to an attribute.

An advantage of the implementation shown in FIG. 12 is that it has only as many hash tables as there are attributes, rather than having as many hash tables as there are tickets/tuples (expected ratio is 10 times the tickets). Another advantage is that the lookup time is of order O(1). A disadvantage to the implementation shown in FIG. 12 is that it is difficult to perform a delete given only the ticket/tuple ID. This is where the fourth hash table 43 is used. The fourth hash table 43 is a large hash table that is keyed off the ticket/tuple ID. The element values in the fourth hash table 43 are references to an attribute value, and work as the head of a linked list for all the elements in the tuple off of which they are keyed. The Attribute next values help for a linked list to facilitate an easy delete operation when a ticket is set to recycle its values. The use of attribute next values complicates the steps of deletion and adds more bookkeeping to maintain a linked list between the tuple attributes, but is still faster and uses less memory than the implementations shown in FIGS. 10 and 11.

Figure 13:
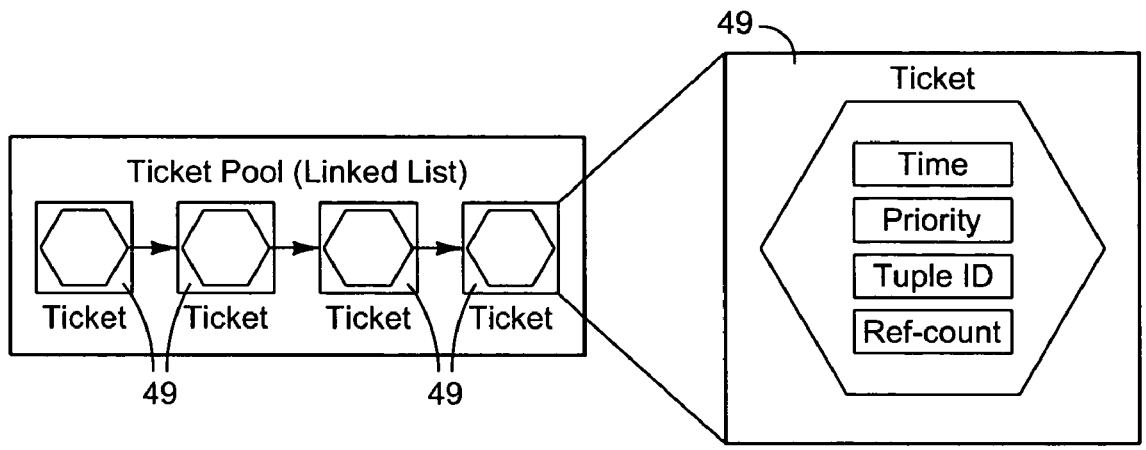
FIG. 13 shows an embodiment of a ticket pool.

The tickets 49, shown in FIG. 13, comprise handles to tuples. As shown in FIG. 13, each ticket contains a long integer value timestamp ("Time") that indicates the time at which the tuple was created, a priority ("Priority"), a reference by an ID ("Tuple ID") to a tuple in the tuple store 40 (accessing the tuple store 40 with a tuple ID, which is the same as the ticket ID), and a reference count (Ref-count). The timestamp can be used as a reference point to determine the time of live conditions and thresholds. The priority informs the match network how important the data contained in the ticket 49 is for processing. The reference count indicates how many match network nodes are holding on and accessing the tuple at any time.

Tickets 49 are instantiated and placed in a ticket pool at the same time that the rule component is initialized. There is a configurable upper bound on how many possible tickets 49, which serve as inputs, can be processed at one time. This upper bound enables the rule component to limit and set an upper bound on the memory consumption of the rule memory.

When the ticket reference count reaches zero, the attribute values of the tuples are preferably set to zero. When the ticket reference count reaches zero, the ticket will also notify the tuple store 40 to recycle the tuple ID that was used. The ticket 49 is then placed back into the ticket pool store, and is ready for reuse on a different tuple.

When a ticket 49 is assigned to a tuple, the ticket 49 is placed in a ticket priority list outside the working memory 10. The ticket priority list comprises a means of transferring and queuing input to the match network module.

Figure 14:
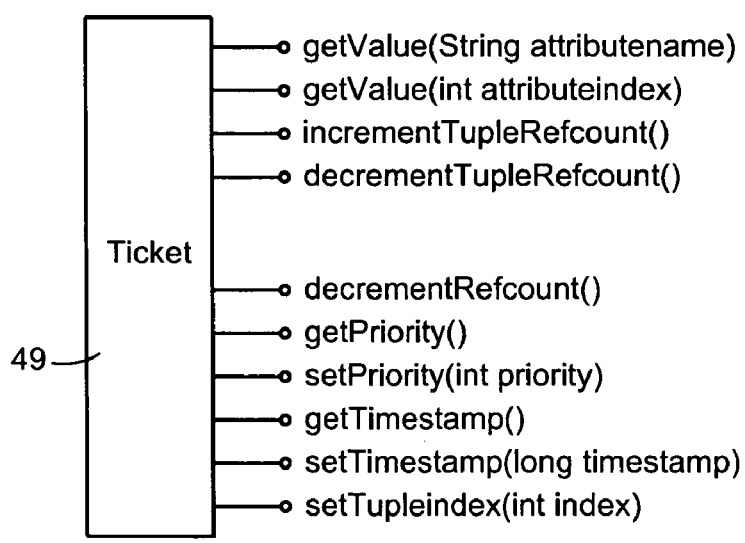
FIG. 14 shows an interface between a ticket and some of its methods.

FIG. 14 shows an interface between a ticket 49 and some of its methods. The method getValue(String attributename) gets a value from a tuple given the attribute name. The method incrementRefcount( ) increments the reference count of the tuple. The method decrementTupleRefcount( ) decrements the reference count of the tuple. The method getPriority( ) gets the process priority of the tuple. The method setPriority (int priority) sets the process priority of the tuple. The method getTimestamp( ) gets the 'time of creation' for the tuple. The method setTimestamp(long timestamp) gets the 'time of creation' for the tuple. The method setTupleIndex(int index) sets the index of the tuple that the ticket is associated with.

Figure 15:
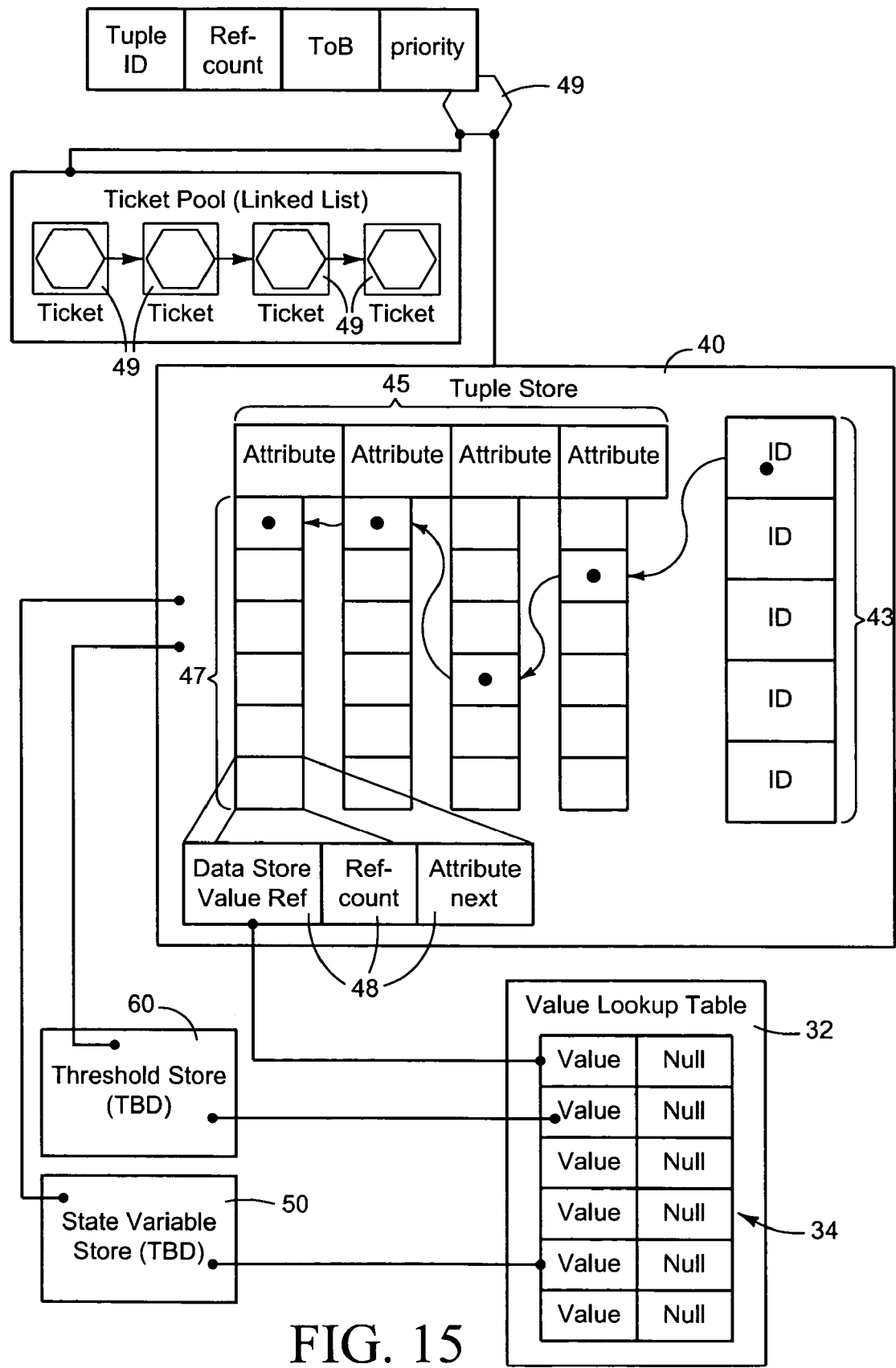
FIG. 15 shows a relationship between the value lookup table sub-module, the tuple store sub-module, the threshold store, and the state variable store.

FIG. 15 shows the working memory module 10 in detail with the sub-modules tuple store 40, value lookup table 32, and threshold store sub-module 60 and state variable store sub-module 50. When a value is added to the tuple store sub-module 40, the data store sub-module 30 queries the value lookup table sub-module 32, which queries its weak hash map 34 to determine whether the value has already been stored. If the value has not been stored, then the data store sub-module 30 has the value lookup table sub-module 32 create a new entry to the weak hash-map 34. If the data has been stored, it returns a reference to the previously stored data, thus increasing the reference count on the data in the weak hash map by 1.

As input is received by the working memory module 10, and values from the input are added to the data store sub-module 30, the working memory module 10 creates a tuple to represent the input. The tuple is a collection of data store values representing an input. When adding a tuple, a unique identifier number and a ticket may be assigned to the tuple. The tickets 49 are pre-allocated and are stored in the ticket pool, so when a new tuple is added, a ticket 49 is retrieved from the pool, and the ticket's ID also becomes the tuple ID. The references from adding the values to the data store sub-module 30 are stored under their associated attribute name with the new ticket ID in the tuple store 40. The ticket 49 is then handed to the match network.

Also the threshold store sub-module 60 and the state variable store sub-module 50 create tuples in the tuple store sub-module 40 and access values in the data store sub-module 30.

Memory Conservation

The rule component is capable of performing correlation rules across multiple input tuples within a set time frame. If this set time frame is set to a higher value than the rate of inputs, then the amount of input tuples held in memory will continuously outgrow the number of tuples removed from the working memory module 10. To prevent the rule component from running out of memory, the rule component limits the number of inputs existing at any time in order to prevent the rule component from continuously allocating new objects for new input. The number of inputs in the working memory, i.e., the number of tickets generated, may be limited by pre-allocating a fixed set of tickets and adding them to a ticket pool, and adding a maximum number of tickets processed at any given time. When the maximum ticket count is reached, no more input tuples will be generated until a ticket is fully processed and becomes available for handling a new input tuple.

The number of tickets created may have a maximum value, but may also be configurable to enable less memory consumption by the rule component. This reduction in memory consumption occurs because the number of tickets governs not only the number of rule triggers, but also the amount of data stored in the tuple store sub-module 40 and the data store sub-module 30. In the tuple store sub-module 40, there may be a fixed number of possible attributes, and a fixed number of tickets 49 will lead to a fixed number of tuples. With a fixed number of tickets 49 and possible attributes, the largest size that the data store sub-module 30 could become would be the number of tickets 49 multiplied by the number of attributes, plus some constant values. Because these numbers are known, there exists a means of controlling the amount of memory allocated in the knowledge base. Also, the initial sizes of data structures used as value stores can be computed by determining how hash table space is allocated.

The allocated hash table space may be determined as follows. Hash tables start with an initial size, but grow in allocated space when the number of entries meets a certain threshold size value. Hash tables take two arguments, initialCapacity (an integer) and loadfactor (a float variable). By default, these values are 11 and 0.75f, respectively. A threshold value is such that the threshold=(int)(capacity×loadfactor), where the threshold based on the default arguments is eight by default (rounded down because of integer cast). If a threshold is exceeded, then the hash table grows to a new capacity that is equal to twice the current capacity, plus one. Assuming that hash table size starts at the default values, then the possible allocation sizes are 11, 23, 47, 95, 191, 383, 767, 1535, 3701, 6143, 12287, 24575, 49151, 98303, 196607, and so on.

Figure 16:
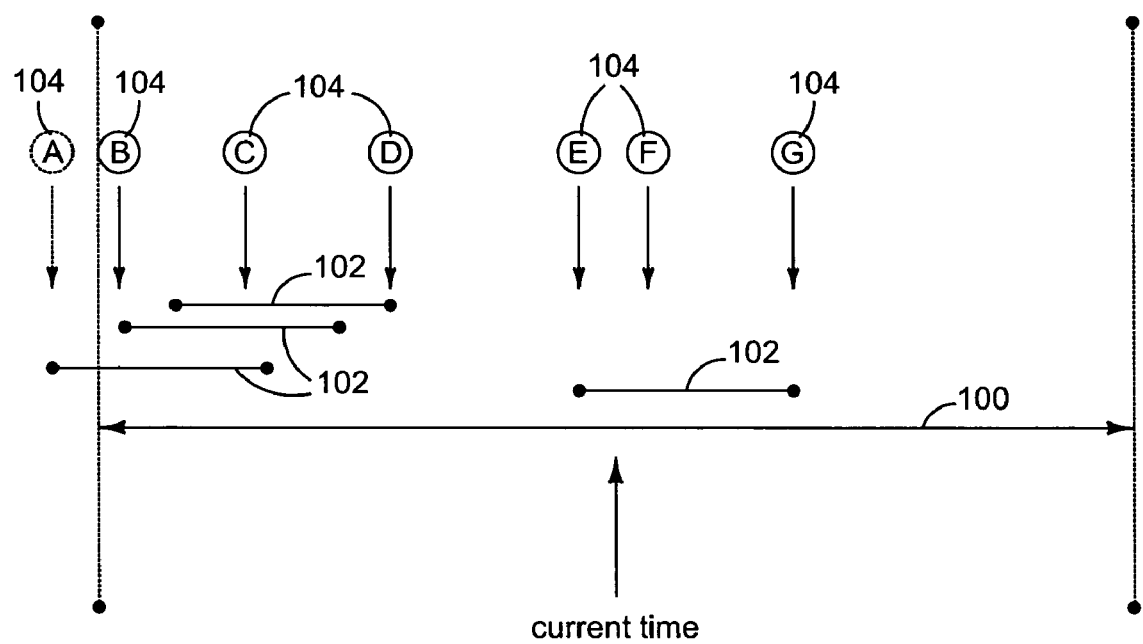
FIG. 16 shows an embodiment of a timeline and the relationship between within times, response windows, and pieces of data with regard to the current system time.

FIG. 16 shows an input discrimination feature that is used to conserve memory. This discrimination feature involves two temporal concepts, namely within time 102, and response window 100. The within time 102 value is a relative time value within which two alerts 104 must have occurred to be recognized by the system correlating these input events. The actual time of the system correlating the alerts 104 is not taken into account for purposes of the within time 102.

The response window 100 maintains an absolute time range, measured from the actual time of the correlation system, from which an event's real-time significance is evaluated. If an alert 104 occurs outside the range of the response window 100, it will not be considered for correlation with other alerts 104, and will be removed from memory.

An event's real time significance may be evaluated at the intersected range of the within time 102 and the response windows 100. An event loses its real-time value as time moves past the moment at which the event occurred and approaches the edge of the response window 100. However, while the event is still within the response window 100, the event remains significant and improves the value and accuracy of the correlation.

FIG. 16 shows an example of this input discrimination feature. In this example, the within time 102 is five seconds, and the response window-100 is larger than the within time 102 (the actual number is not needed), extending to the vertical dotted lines. When the alerts 104 originate, they are assigned an input value representing the time at which they occurred. In the illustrated example, the rule provides that if three alerts 104 occur within both the within time 102 and the response window 100, then the action will be triggered.

Even though alerts 104 A, B, and C satisfy the within time 102 value of five seconds, these alerts 104 will not trigger the action because alert A has fallen outside the response window 100, and will not be considered for triggering the action.

Alerts 104 B, C, and D will not trigger the action because while alerts B and C fall in the within time 102 value, alert D does not. Likewise, alerts 104 B, C, and D will not trigger the action because while alerts C and D fall within the within time 102 value, alert B does not.

Alerts E, F, and G will trigger the action because they all lie within both the response window 100 and the five-second within time 102. Note that while alerts F and G are considered in the future because of the disparity of network times, this does not affect the results. The rule will fire its action with these three alerts.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

What is claimed is:

1. A memory containing an instruction set executable by said processor, said instruction set comprising:

a tuple store sub-module comprising a first hash table including a plurality of elements, wherein each element of the first hash table comprises one of a plurality of second hash tables;

a data store sub-module comprising a value lookup table in communication with the plurality of second hash tables of the tuple store;

a threshold store sub-module in communication with the tuple store sub-module, wherein the threshold store sub-module is configured to create tuples in the tuple store sub-module and to access values stored in the data store sub-module;

a state variable store sub-module in communication with the tuple store sub-module, wherein the state variable store sub-module is configured to create tuples in the tuple store sub-module and to access values stored in the data store sub-module;

wherein the working memory module is configured to maintain only unique data values, which are automatically purged from the working memory module when no longer referenced;

a trigger monitor for determining whether to trigger an action associated with an event correlation rule implemented in a correlation system, the trigger monitor further comprises:

a selector wherein the selector determines whether a plurality of events occur within a selected within time period, wherein the selected within time period is measured from the occurrence of the first of the plurality of events and comprises a relative time period independent of the actual time at which the events occur;

an event detector wherein the event detector determines whether the plurality of events occur within a selected response window, wherein the selected response window is used to evaluate the real-time significance of the events and comprises an absolute time range corresponding to the actual time at which the events occur in the correlation system;

wherein if the plurality of events occur within the selected within time period and within the selected response window, said trigger monitor triggers the action associated with the event correlation rule;

wherein the data store sub-module comprises a data structure configured to store unique input data values;

wherein the data structure is configured to store unique input data values by converting duplicated input values to unique values and removing unused data values from the data store sub-module;

wherein the value lookup table comprises a weak hash map which comprises elements associated with lookup keys;

wherein each tuple comprises a unique identification value;

the working memory module further comprises a plurality of tickets, wherein each ticket in the plurality comprises an identification value which is identical to the unique identification value of one of the tuples;

wherein each ticket further comprises a long value time stamp and a reference count;

wherein the working memory module is configured to recycle the identification value when the reference count reaches zero;

wherein the working memory module is configured to place the tickets in a ticket priority list when the tickets are assigned to the tuples;

wherein the working memory module is configured to receive input, and the created tuples represent the input;

wherein the working memory module is configured to conserve memory by pre-allocating a set of tickets which correspond to the created tuple, and ceasing to generate new tuples after all of the pre-allocated tickets have been assigned to created tuples.

* * * * *